(12) United States Patent
Endo et al.

(10) Patent No.: US 7,095,203 B2
(45) Date of Patent: Aug. 22, 2006

(54) NUMERICAL CONTROLLER

(75) Inventors: Takahiko Endo, Kokubunji (JP); Yasushi Takeuchi, Hino (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/821,917

(22) Filed: Apr. 12, 2004

(65) Prior Publication Data

US 2004/0207356 A1 Oct. 21, 2004

(30) Foreign Application Priority Data

Apr. 21, 1920 (JP) .............................. 2003-116010

(51) Int. Cl.
  *G05B 19/33* (2006.01)
(52) U.S. Cl. ................... 318/575; 318/569; 318/568.2; 700/159; 700/249
(58) Field of Classification Search ........ 318/574–575, 318/625, 632, 560, 567, 638, 85, 568.22, 318/568.1, 568.11, 568.12, 568.13, 568.2; 700/71, 1–9, 69
See application file for complete search history.

(56) References Cited

U.S. PATENT DOCUMENTS

| | | | |
|---|---|---|---|
| 4,939,431 A * | 7/1990 | Yamazaki et al. ............. 318/41 |
| 4,981,402 A * | 1/1991 | Krenzer et al. ............... 409/26 |
| 4,988,937 A * | 1/1991 | Yoneda et al. .............. 318/675 |
| 5,047,701 A * | 9/1991 | Takarada et al. ............ 700/246 |
| 5,134,767 A * | 8/1992 | Yasuda ........................... 483/7 |
| 5,173,648 A | 12/1992 | Kawamura et al. .... 318/568.13 |
| 5,175,680 A * | 12/1992 | Yoneda et al. ................ 700/71 |
| 5,270,627 A * | 12/1993 | Rehse ......................... 318/575 |
| 5,656,903 A * | 8/1997 | Shui et al. ............... 318/568.1 |
| 5,689,161 A * | 11/1997 | Fugere et al. ............... 318/563 |
| 5,977,736 A | 11/1999 | Nakazato |
| 6,107,769 A * | 8/2000 | Saylor et al. ................ 318/600 |
| 6,430,465 B1* | 8/2002 | Cutler ......................... 700/193 |
| 6,594,552 B1* | 7/2003 | Nowlin et al. .............. 700/260 |
| 6,786,896 B1* | 9/2004 | Madhani et al. ............... 606/1 |
| 6,862,492 B1* | 3/2005 | Sagasaki et al. ............ 700/159 |
| 6,888,334 B1* | 5/2005 | Fujibayashi et al. ........ 318/625 |

FOREIGN PATENT DOCUMENTS

| | | | |
|---|---|---|---|
| EP | 1308809 A2 * | 5/2003 |
| JP | 10-27013 | 1/1998 |
| WO | WO 2003032097 A1 * | 4/2003 |

* cited by examiner

*Primary Examiner*—Marlon T. Fletcher
*Assistant Examiner*—Renata McCloud
(74) *Attorney, Agent, or Firm*—Staas & Halsey LLP

(57) ABSTRACT

A numerical controller which, after once stopping a slave axis during superposing control, can easily resume the superposing control. In the superposing control, a motion amount for a master axis and a motion amount for the slave axis are added to a workpiece coordinate value of the master axis and a workpiece coordinate value of the slave axis, respectively, to update their present position data (I2, II2). These motion amounts are supplied also to servo processing (I3, II3) for the master axis and the slave axis, where an amount obtained by superposing a motion amount δzIm for the master axis ZIm on a motion amount δzIIs for the slave axis ZIIs is supplied to the servo processing for the slave axis ZIIs. When a slave axis motion stop command is issued, the motion of the slave axis is stopped and a motion amount δzIm for the master axis ZIm is subtracted from the workpiece coordinate value of the slave axis ZIIs. This makes it possible to retain the positional relationship between the master axis and the slave axis, and hence easily resume the superposing control when the motion of the slave axis is restarted.

5 Claims, 6 Drawing Sheets

NUMERICAL CONTROLLER

BACKGROUND OF THE INVENTION

1. Field of the Invention

The present invention relates to a numerical controller for controlling machine tools and various types of industrial machines, and more particularly to a numerical controller for performing superposing control in which a motion command for a master axis is superposed on a motion command for a slave axis.

2. Description of Related Art

Figure 1:
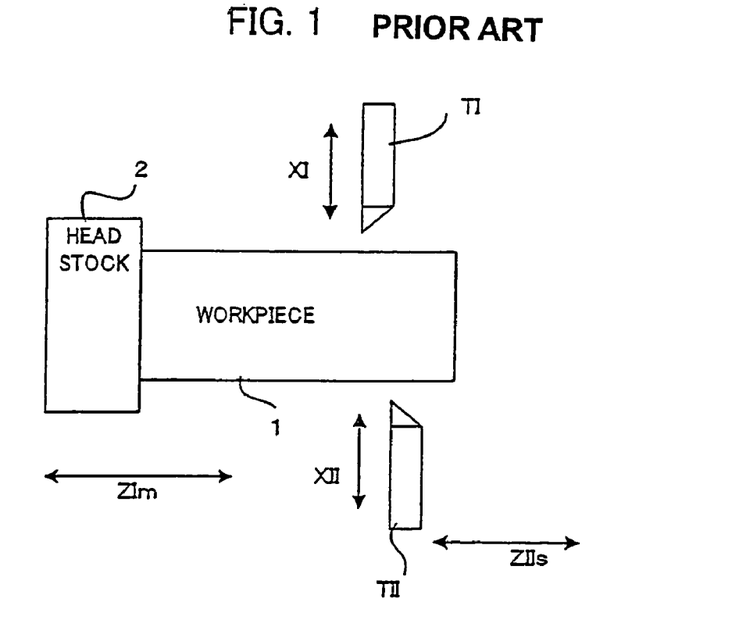
FIG. 1 is an illustration showing an example of a machine tool to which superposing control is applied.

Control in which motion of an axis is superposed on motion of another axis is known as superposing control. Let us suppose that in an example of a machine tool having two control systems, a workpiece 1 fixed to a headstock 2 is machined with a tool TI and a tool TII, as shown in FIG. 1. As the headstock 2 is moved in a ZIm axis direction, the tool TI is moved in an XI axis direction perpendicular to the ZIm axis direction to machine the workpiece 1, and the tool TII is moved in a ZIIs axis direction parallel to the ZIm axis direction and in an XII axis direction perpendicular to the ZIIs axis direction to machine the workpiece 1. Here, the XI axis and the ZIm axis are called as first-system axes and an XI-ZIm coordinate system is called as a workpiece coordinate system for the first-system. Further, the XII axis and the ZIIs axis are called as second-system axes and a XII-ZIIs coordinate system is called as a workpiece coordinate system for the second-system.

In this machining, if the ZIIs axis is moved with the motion of the ZIm axis, the position of the ZIIs axis relative to the workpiece 1 does not change. Hence, when the workpiece 1 is to be machined with the tool TII, a machining program is created on the assumption that motion of the workpiece 1 in the ZIm axis direction is stopped. In actual machining, the ZIIs axis is moved by superposing control in which a motion command for the ZIm axis is added to a motion command for the ZIIs axis. As a result, the tool TII moves and machines the workpiece 1 as instructed by the program. By performing this superposing control, the workpiece 1 can be machined with the XI and ZIm axes and with the XII and ZIIs axes simultaneously. In this superposing control, the ZIm axis is called a master axis while the ZIIs axis is called a slave axis.

An example where the superposing control is performed according to commands of programs will be described.

For example, for the first system, the following program O1000 is conceivable:

O1000;
. . .
. . .
G01 X0 Z0; motion command
G01 X100. Z100.; motion command
. . .
. . .

For the second system, the following program O2000 is conceivable:

O2000;
. . .
. . .
M80; ZIm-axis and ZIIs-axis superposing control start command
G01 X0 Z0; motion command
G01 X100. Z100.; motion command
. . .
M83; ZIm-axis and ZIIs-axis superposing control terminate command
. . .
. . .

In this example, the superposing control start/terminate command are provided in the program O2000 for the second system.

Figure 2:
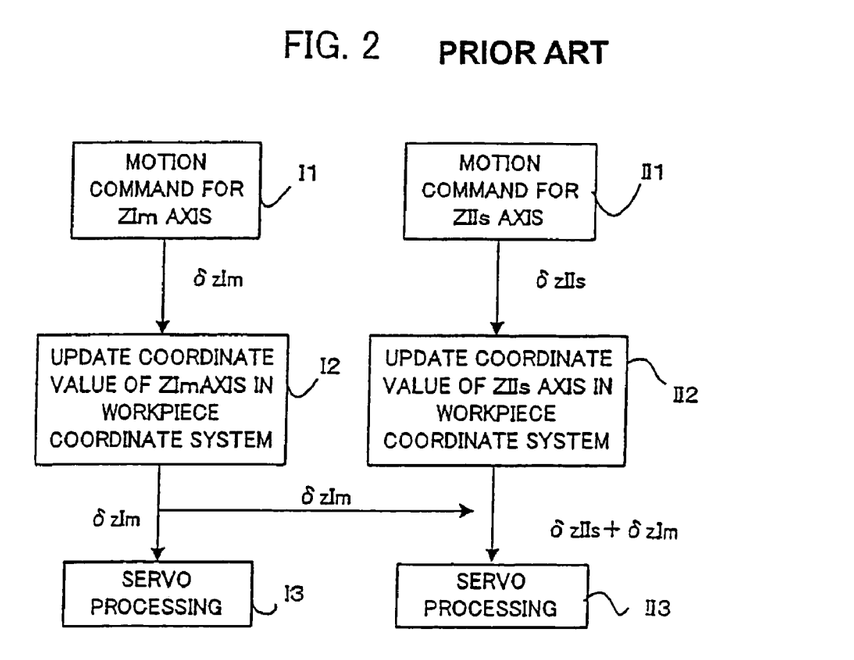
FIG. 2 is a diagram showing how the superposing control operates in the above example.

FIG. 2 is a diagram schematically showing position control by this superposing control. While the superposing control is being performed (in one example, from the time when a superposing control start command is read from a program till the time when a superposing control terminate command is read), a motion amount δzIm based on a motion command (I1) for the master axis ZIm, which is obtained by the numerical controller in each distribution period, is added to a present value register for the master axis ZIm to update the stored coordinate value of the ZIm axis in a workpiece coordinate system for the first-system (I2). The motion amount δzIm is also inputted to a first-system servo processing section (I3). Meanwhile, a motion amount δzIIs based on a motion command (II1) for the slave axis ZIIs is added to a present value register for the slave axis ZIIs to update the stored coordinate value of the ZIIs axis in the workpiece coordinate system for the second system (II2). For the slave axis ZIIs, a motion amount (δzIIs+δzIm) obtained by adding the motion amount δzIm based on the motion command for the master axis ZIm to the motion amount δzIIs based on the motion command for the slave axis ZIIs is inputted to a second-system servo processing section (II3). The above-mentioned superposing control is performed this way. The superposing control like this is already known to the public (see JP 10-27013A, for example). There are such cases that while the above-mentioned superposing control is being performed, over-travelling of the slave axis happens and an alarm is sent out, or a tool or the like moved by the slave axis interferes with another part, due to superposition of a motion command for the master axis on a motion command for the slave axis.

As a way to prevent trouble like this, it is effective to cancel the superposing control in advance when trouble like this is expected. However, when the superposing control is cancelled, a motion command for the master axis is no longer delivered for the slave axis. As a result, recognition of positional relationship between the master axis and the slave axis is lost, and hence recognition of positional relationship between the workpiece, which is moved by the master axis, and the slave axis is lost.

When the superposing control once cancelled is to be restarted in the positional relation before the termination of the superposing control, it is necessary to calculate the positional relationship between the master axis and the slave axis again and set a slave-axis workpiece coordinate system on the basis of the obtained positional relationship, again. This however requires complicated calculations on the basis of various kinds of machine and workpiece data such as the workpiece coordinate value of the master axis and the workpiece coordinate value of the slave axis at the time the superposing control was cancelled and is to be start again. It is very difficult for an operator to perform the required calculations.

SUMMARY OF THE INVENTION

The invention provides a numerical controller capable of stopping motion of a slave axis during the superposing control without canceling the superposing control so that the superposing control is suspended, and then restart the motion of the slave axis so that the superposing control is resumed with ease.

A numerical controller of the present invention performs a superposing control to control motion of a slave axis parallel to a master axis for moving a workpiece, by a superposed motion command obtained by superposing a motion command for the master axis on a motion command for the slave axis. The numerical controller comprises: means for receiving a slave-axis motion suspending command commanded by a program or an inputted signal in the superposing control; and means for suspending the motion of the slave axis and subtracting an amount of the motion command for the master axis from a coordinate value of the slave axis in a workpiece coordinate system set to the workpiece when the slave-axis motion suspending command is received.

The numerical controller comprises: means for receiving a slave-axis motion resuming command commanded by the program or an inputted signal; and means for resuming the motion of the slave axis so that the superposing control is resumed when the slave-axis motion resuming command is received.

DETAILED DESCRIPTION

First, principle of the present invention will be described referring to FIGS. 3 and 4 with respect to the example of machining as shown in FIG. 1. In FIG. 1, the axis on which superposing control is performed is the ZIIs axis as a slave axis. The XII axis does not have a direct connection with the superposing control. Hence, description will be made on the ZIm axis as a master axis and the ZIIs axis as a slave axis. For the sake of the concise description, elements or amounts related to the master axis and elements or amounts related to the slave axis are distinguished by adding suffixes "m" and "s", respectively. Further, elements or amounts related to a first system and things related to a second system are distinguished by adding letters "I" and "II", respectively.

Figure 3:
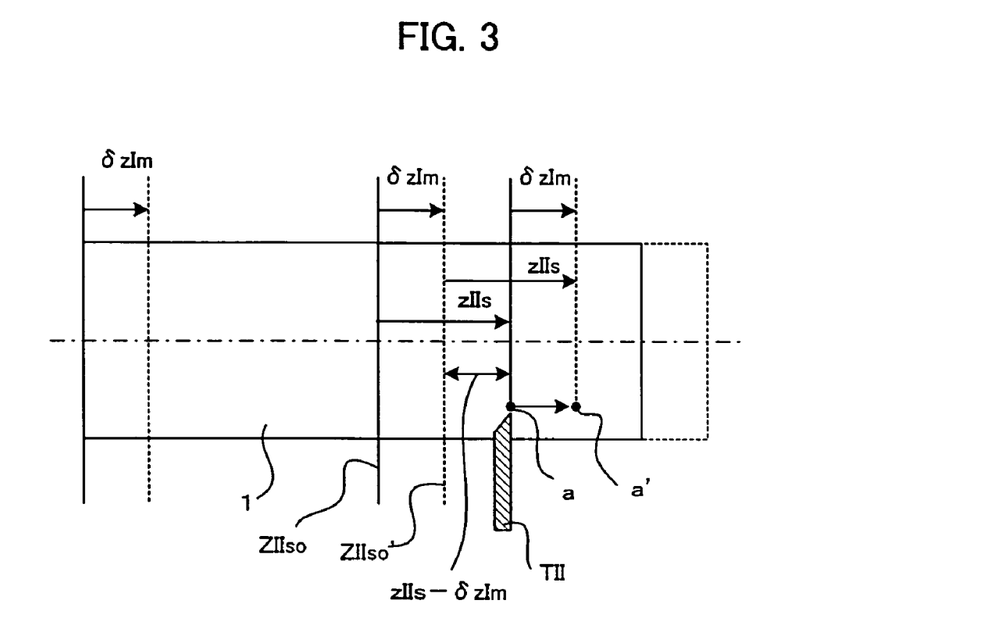
FIG. 3 is an illustration for explaining the principle of the invention, showing the relation which a master axis, a slave axis and a workpiece show when motion of the slave axis is stopped during the superposing control.

FIG. 3 is an illustration for explaining how control is performed without discontinuing the superposing control, after a slave axis motion suspend command is inputted. FIG. 3 shows a state at the time the superposing control is to be resumed after the master axis ZIm has moved by δZIm. Let us suppose that the coordinate position which the slave axis ZIIs took in the workpiece coordinate system set to the workpiece just before the superposing control was suspended is zIIs.

Since the motion of the slave axis has been stopped, the coordinate position zIIs of the slave axis in the workpiece coordinate system has not changed. Meanwhile, since the master axis ZIm has moved by δzIm, the workpiece 1 has moved by δzIm. A position "a" on the workpiece 1 that confronted the tool TII just before the superposing control was suspended has moved to a position a' in FIG. 3.

When the suspension of motion of the slave axis is cancelled and the superposing control is resumed, in order to restore the positional relationship when the superposing control was suspended, it is necessary to move the tool TII by δzIm. By this, the tool TII and the workpiece 1 as well as the master axis and the slave axis are brought back to the positional relationship which they had just before the superposing control was suspended. In this case, however, the coordinate value of the ZIIs axis in the workpiece coordinate system for the second system becomes zIIs+δzIm, not zIIs which the ZIIs axis took just before the superposing control was suspended. Hence, in the present invention, a value obtained by reversing a sign of the motion amount δzIm for the master axis ZIm after suspending the superposing control is added to the coordinate value of the slave axis ZIIs. Namely, the motion amount δzIm for the master axis ZIm after suspending the superposing control is subtracted from the coordinate value of the slave axis ZIIs. As a result, after the superposing control is suspended the slave axis ZIIs takes a coordinate value zIIs−δzIm.

This means that an origin ZIIso of the ZIIs axis in the workpiece coordinate system for the second system is shifted by δzIm to ZIIso'. Then, when the superposing control is resumed, the slave axis is moved at the position having a coordinate value zIIs, which is the coordinate value that the slave axis had before it was stopped. Thus, the slave axis is moved by δzIm, so that the tool TII is adjusted to the position a' on the workpiece 1, and the master axis and the slave axis as well as the workpiece and the slave axis are brought back to the positional relation which they had just before the superposing control was suspended.

Figure 4:
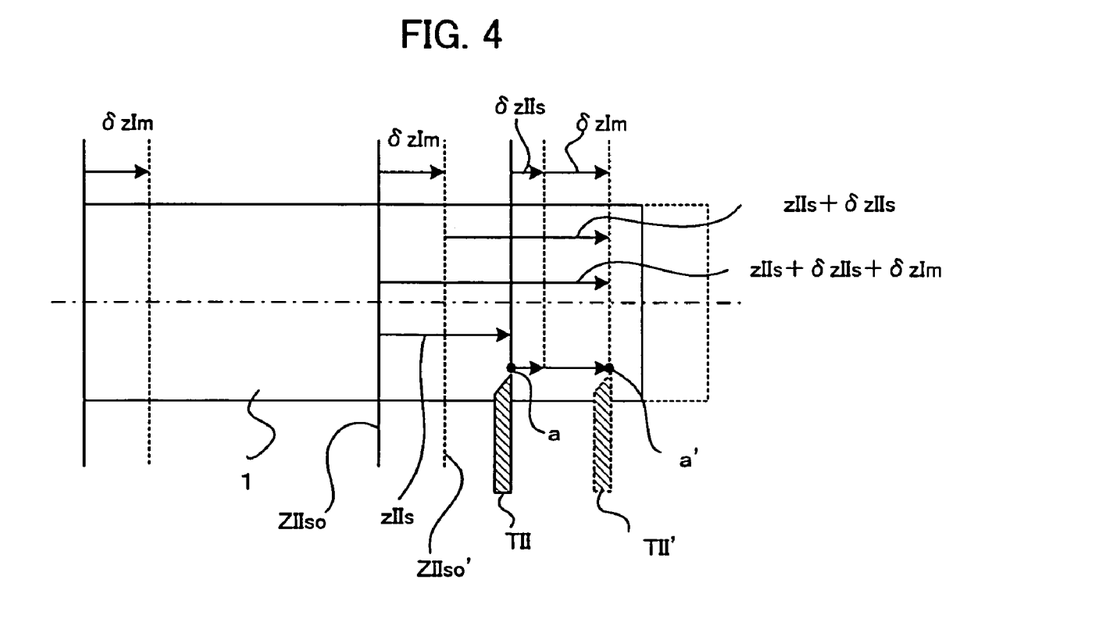
FIG. 4 is an illustration showing the relation which the master axis, the slave axis and the workpiece show during the superposing control.

FIG. 4 is an illustration for explaining the positional relationship which the master axis and the slave axis show during the superposing control. Let us suppose that a motion command based on which a motion amount δzIm is designated is inputted for the master axis ZIm, and that a motion command based on which a motion amount δzIIs is designated is inputted for the slave axis ZIIs. In this case, as shown in FIG. 2, the value obtained by adding the value δzIm based on the motion command for the master axis to the value δzIIs based on the motion command for the slave axis is inputted for the slave axis ZIIs. As a result, the tool TII moves by (δzIIs+δzIm). Meanwhile, the workpiece 1 moves by δzIm based on the motion command for the master axis. Hence, the tool TII moves relatively to the workpiece 1 only by δzIIs, namely by the motion amount based on the motion command for the slave axis, and performs machining.

Meanwhile, as shown in FIG. 2, the coordinate value of the ZIIs axis in the second-system workpiece coordinate system is zIIs+δzIIs, since the motion amount δzIIs based on the motion command for the slave axis is added. This means that the original position ZIIso of the ZIIs axis in the second-system workpiece coordinate system is shifted from ZIIso by δzIm to ZIIso'. Specifically, since the ZIIs axis that is a slave axis (tool TII) moved by the motion amount (δzIIs+δzIm), the position of the ZIIs axis that is a slave axis (tool TII) should be obtained as (zIIs+δzIIs+δzIm) by adding this motion amount to the the pre-motion position zIIs. However, actually, as shown in FIG. 2, only the motion amount δzIIs based on the motion command for the slave axis is added to the pre-motion coordinate value of the slave axis in the second-system coordinate system, hence the resultant coordinate value is (zIIs+δzIIs). This means that the coordinate value of the slave axis is a value obtained by subtracting the master axis motion amount δzIm from the actual motion amount. Thus, $$\text{coordinate value of slave axis} = \text{pre-motion position} + \quad (1)$$
$$\text{actual motion amount} -$$
$$\text{master axis motion amount}$$
$$= zIIs + \delta zIIs + \delta zIm - \delta zIm$$
$$= zIIs + \delta zIIs.$$

The above shows that when the superposing control is being performed, a value obtained by subtracting the master axis motion amount from the slave axis ZIIs actual motion amount should be added to the pre-motion coordinate value of the slave axis in the second-system workpiece coordinate system. The above also shows that the origin of the second-system workpiece coordinate system is shifted by the master axis motion amount.

When the superposing control is suspended and motion of the slave axis is stopped, the slave axis moves by δzIIs+δzIm=0. Hence, from the expression (1), the coordinate value of the slave axis in the second-system workpiece coordinate system is as follows:

$$\text{Coordinate value of slave axis} = zIIs + \delta zIIs + \delta zIm - \delta zIm \quad (2)$$
$$= zIIs - \delta zIm.$$

Figure 5:
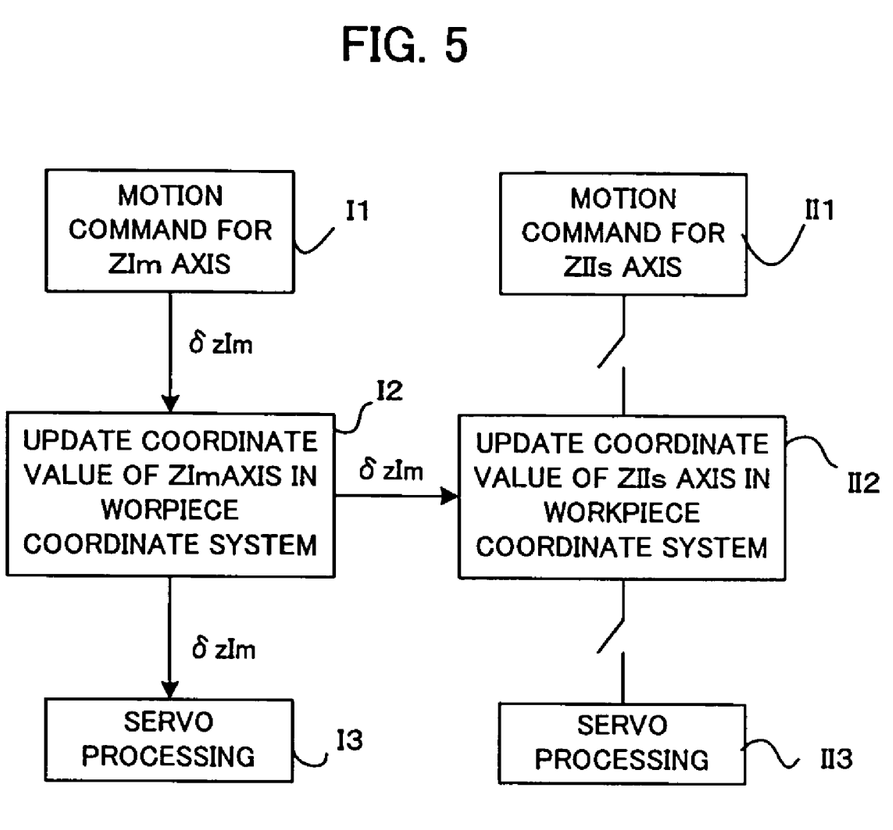
FIG. 5 is a diagram showing how the control operates when motion of the slave axis is stopped during the superposing control according to the invention.

FIG. 5 is a diagram schematically showing how position control is performed when the superposing control shown in FIG. 2 is suspended and motion of the slave axis is stopped.

A motion amount based on a motion command (I1=δzIm) for the master axis ZIm, which is obtained by the numerical controller in each distribution period, is added to the master axis ZIm present value register to update the registered coordinate value of the ZIm axis in the workpiece coordinate system for the first-system (I2). The motion amount δzIm is also inputted to the first-system servo processing section (I3). Meanwhile, for the slave axis ZIIs, a motion command (II1) is not inputted to the updating part (II2) for updating the registered coordinate value of the ZIIs axis in the second-system workpiece coordinate system nor to the second-system servo processing section (II3). However, to the updating part (II2) for updating the registered coordinate value of the ZIIs axis in the second-system workpiece coordinate system, the value δzIm based on the motion command for the master axis is inputted from the updating part (I2) for updating the registered coordinate value of the ZIm axis in the workpiece coordinate system for the first-system. This value δzIm based on the motion command for the master axis is subtracted from the workpiece coordinate value of the slave axis ZIIs.

Figure 6:
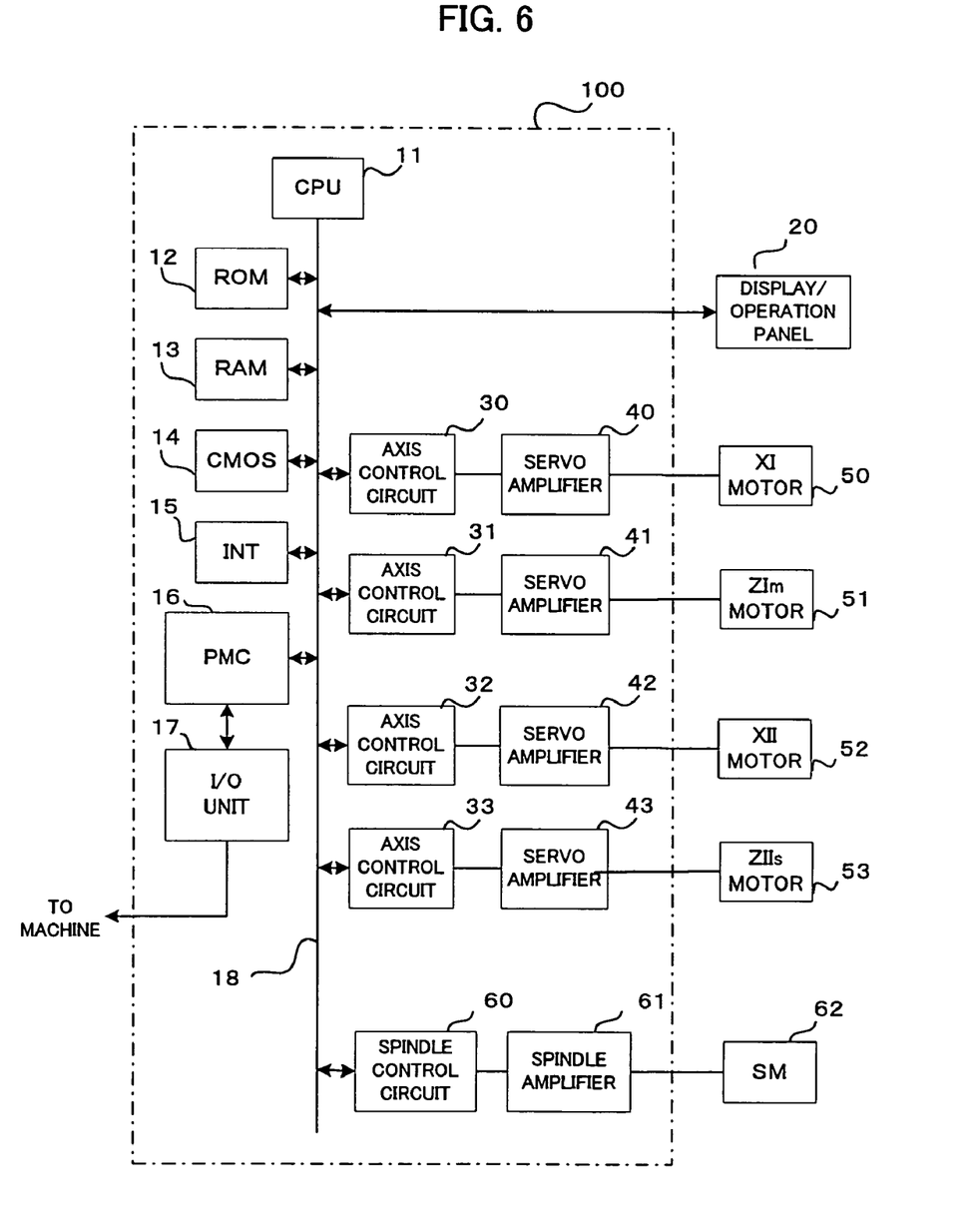
FIG. 6 is a block diagram showing relevant parts of a numerical controller according to an embodiment of the invention.

FIG. 6 is a block diagram showing a numerical controller 100 according to an embodiment of the invention. The numerical controller 100 has two controlled axis systems each consisting of an X axis and a Z axis as shown in FIG. 1. One of the two controlled axis systems is a first system (XI, ZIm), and the other is a second system (XII, ZIIs). The numerical controller controls a lathe machine tool through these controlled axis systems. A CPU 11 is a processor controlling the whole numerical controller 100. Through a bus 18, the CPU 11 reads system programs stored in ROM 12, and controls the whole numerical controller according to the system programs. In RAM 13 is stored temporary calculation data, display data, and data of various kinds entered by an operator on a display/operation panel 20. CMOS memory 14 is backed up by a battery (not shown) and formed as nonvolatile memory that keeps what is stored even when power is turned off. In the CMOS memory 14 are stored machining programs read through an interface 15, machining programs entered on the display/operation panel 20, and the like.

The interface 15 allows the numerical controller 100 to be connected to external devices. A PMC (programmable machine controller) 16 sends out signals to an assist device of the machine tool, according to sequence programs stored in the numerical controller 100, through an I/O unit 17, to thereby control the machine tool. The PMC also receives signals from various switches and the like on a console panel provided to the machine tool body, performs necessary signal processing on the signals and delivers the signals to the CPU 11. The display/operation panel 20 is a manual data input device including a display such as a liquid crystal display or a CRT display, a keyboard, and others.

Axis control circuits 30 to 33 for two axis systems each consisting of an X axis and a Z axis, which move tools TI and TII and a workpiece 1, receive motion command amounts for the individual axes from the CPU 11, and feed commands for the individual axes to servo amplifiers 40 to 43. Receiving the commands, the servo amplifiers 40 to 43 drive servo motors 50 to 53 for the individual axes. The servo motors 50 to 53 for the individual axes each include a position and speed detector. The servo motors 50 to 53 feed position and speed feedback signals from their position and speed detectors back to the axis control circuits 30 to 33, to thereby perform position and speed feedback control. It is to be noted that the position and speed feedback is omitted in FIG. 6.

A spindle control circuit 60 performs speed control on the basis of a spindle speed signal and a feedback signal from a position coder (not shown). The spindle control circuit 60 sends out a spindle speed signal to a spindle amplifier 61 and speed-controls a spindle motor 62.

The hardware configuration of the numerical controller as described above is already known in the art.

In this embodiment, in order to temporarily stop the slave axis during superposing control and suspend the superposing control, commands are inputted manually or provided in a program. An example where the slave axis is stopped and the superposing control is suspended by commands provided in a program will be described.

For example, for the first system, the following program O1001 is conceivable:
    O1001;
    . . .
    . . .

G01 X0 Z0; motion command
G01 X100. Z100.; motion command
...
...
For the second system, the following program O2001 is conceivable:
O2001;
...
...
M80; ZIm-axis and ZIIs-axis superposing control start command
M81; ZIIs-axis (slave axis) motion suspend command
...
...
M82; ZIIs-axis (slave axis) motion resume command
M83; ZIm-axis and ZIIs-axis superposing control terminate command
...
...

In this example, the slave axis motion suspend/resume commands are provided in the program O2001 for the second system.

The processor 11 of the numerical controller 100 executes the program for the first system and the program for the second system as shown above, in parallel.

Regarding the first system, the same process as a conventional one is performed, of which the description will be omitted. Also regarding the XII axis of the second system that is not a slave axis, the same process as a conventional one is performed, of which the description will be omitted.

Figure 7:
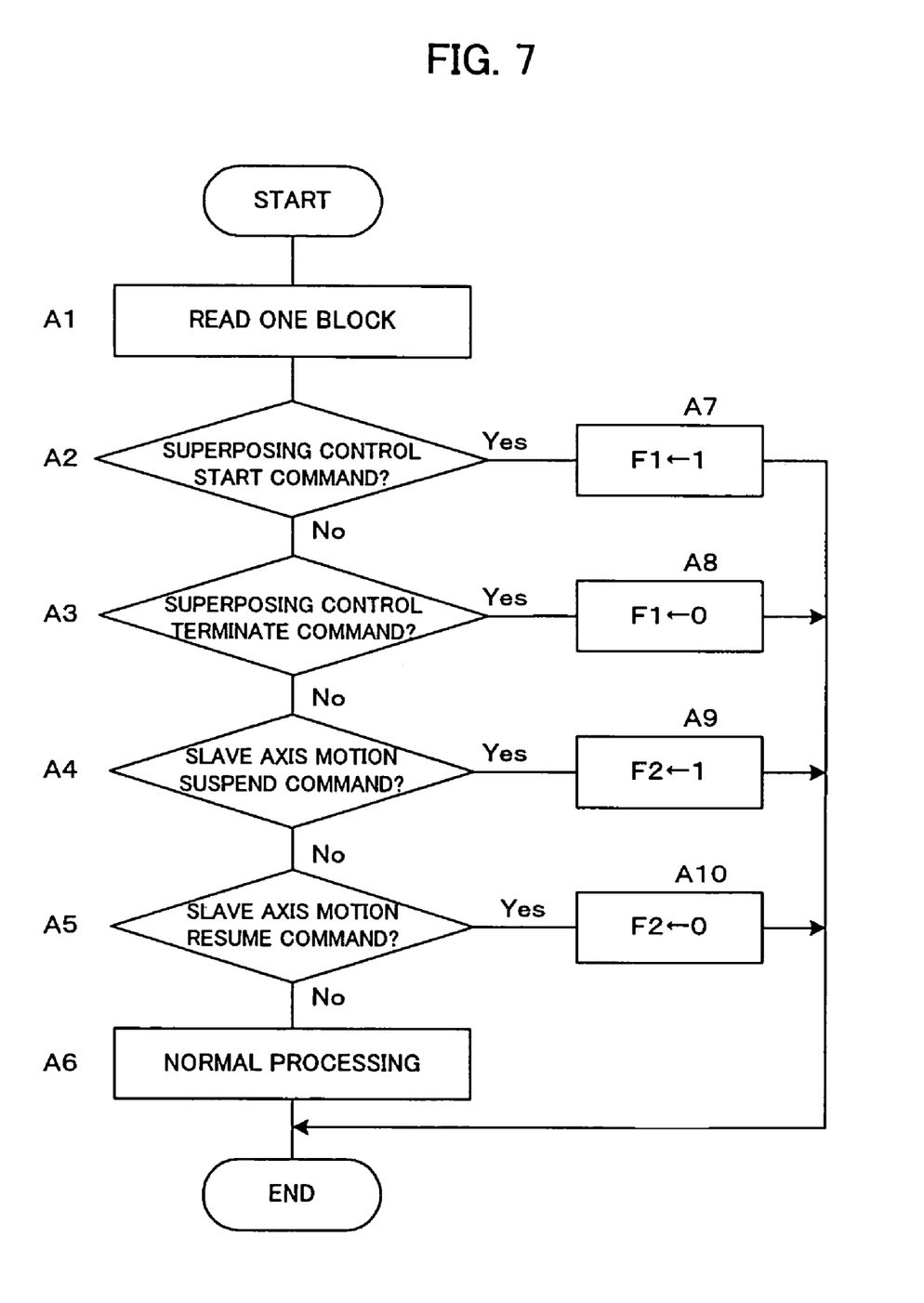
FIG. 7 is a flow chart showing a preliminary process performed for the slave axis in the above embodiment.
Figure 8:
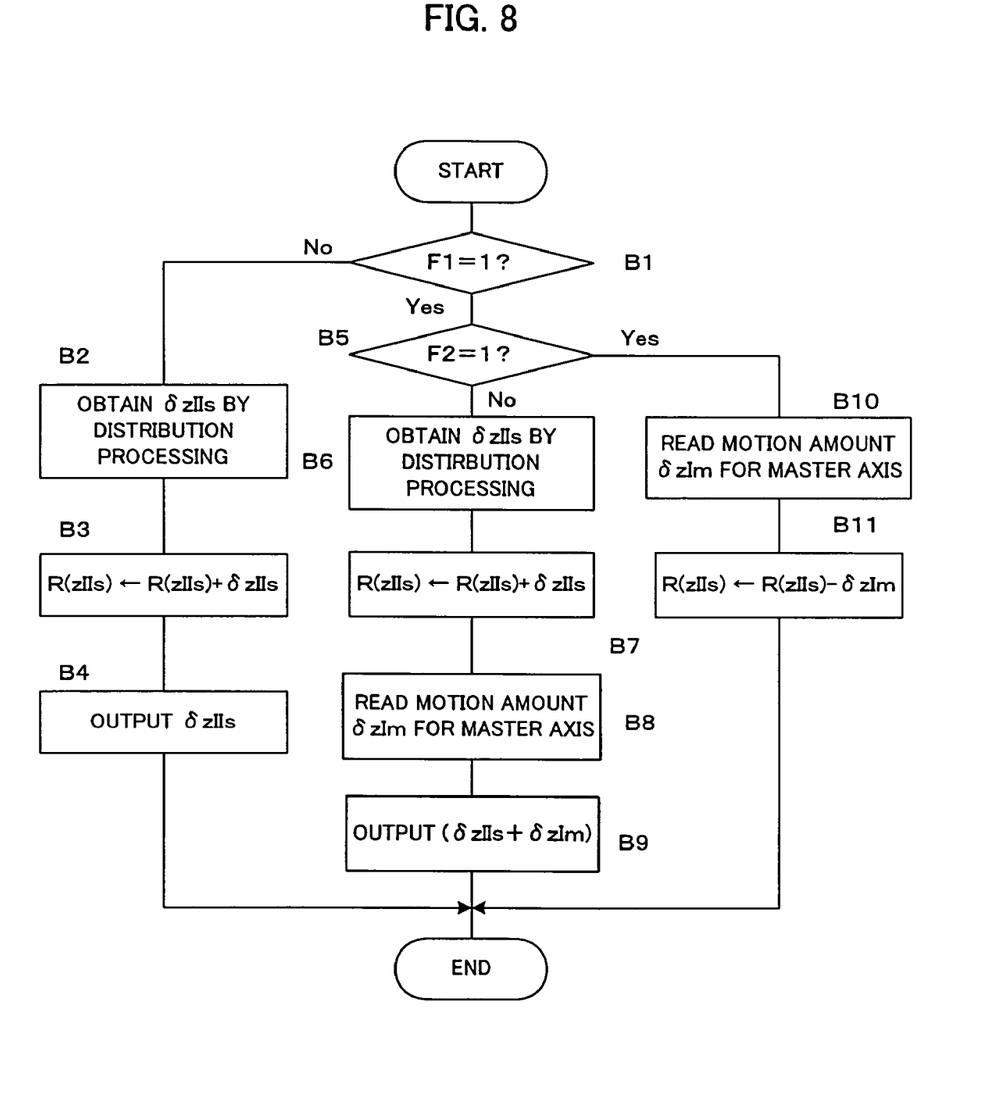
FIG. 8 is a flow chart showing a process performed for the slave axis in each distribution period in the above embodiment.

FIGS. 7 and 8 are flow charts showing processing according to the program for the second system. FIG. 7 shows processing performed by the processor 11 in a preliminary-processing period, while FIG. 8 shows processing performed in each distribution period.

First, preliminary processing shown in FIG. 7 will be described.

The processor 11 reads one block from the program for second system (Step A1), and determines whether a command in the block is a superposing control start command or not (Step A2), whether it is a superposing control terminate command or not (Step A3), whether it is a slave axis motion suspend command or not (Step A4), and whether it is a slave axis motion resume command or not (Step A5). When the command in the block is none of these commands, normal preliminary processing is performed according to the command in the block read in Step A1 (Step A6).

When in Step A2 it is determined that the command in the block is a superposing control start command, a flag F1 is set at "1" in Step A7. When in Step A3 it is determined that the command in the block is a superposing control terminate command, the flag F1 is set at "0" in Step A8. When in Step A4 it is determined that the command in the block is a slave axis motion suspend command, a flag F2 is set at "1" in Step A9. When in Step A5 it is determined that the command in the block is a slave axis motion resume command, the flag F2 is set at "0" in Step A10. The above processing is performed in the preliminary-processing period.

It is to be noted that in the case where a slave axis motion suspend command and a slave axis motion resume command are manually inputted from a keyboard or the like of the display/operation panel 20, the flag F2 is set at "1" with the slave axis motion suspend command, and at "0" with the slave axis motion resume command.

In each interpolation period, the processing as shown in FIG. 8 is performed.

The processor 11 determines whether the flag F1 is at "1" or not (Step B1). When a superposing control start command has not been read and hence the flag F1 has not been set at "1", normal interpolation is performed. Specifically, interpolation is performed on the basis of a motion command that has been obtained by the normal preliminary processing in Step A6, to thereby obtain a motion amount δzIIs by which the slave axis ZIIs should move (Step B2). Then, the motion amount δzIIs for the ZIIs axis is added to the Z axis present value register R (zIIs) to update the registered coordinate value of the ZIIs axis in the second-system workpiece coordinate system (Step B3). The motion amount δzIIs obtained in Step B2 is also outputted to the axis control circuit 33 for the slave axis ZIIs (Step B4). The axis control circuit 33 performs position and speed feedback control on the basis of this motion amount and a feedback signal from the position and speed detector (not shown), to thereby drivingly controls the servo motor 53 for the slave axis through the servo amplifier 43. As long as the flag F1 is not set at "1", the processing from Step B1 to Step B4 is performed in each interpolation period.

When an superposing control start command has been read and hence the flag F1 has been set at "1" in Step A7 of the preliminary processing, Step B5 is performed after Step B1, namely whether the flag F2 is at "1" or not is determined. When the flag F2 is not at "1", namely a slave axis motion suspend command has not been inputted, superposing control is performed. Specifically, first, as in Step B2, a motion amount δzIIs by which the slave axis ZIIs should move is obtained by distribution (Step B6). Then, as in Step B3, the motion amount δzIIs for the ZIIs axis is added to the Z axis present value register R (zIIs) to update the registered coordinate value of the ZIIs axis in the second-system workpiece coordinate system (Step B7).

Next, a motion amount δzIm for the master axis ZIm of the superposing control in the present interpolation period is read (Step B8). For the slave axis ZIIs, the motion amount δzIm for the master axis ZIm read in Step B8 is added to the motion amount δzIIs obtained in Step B6, and the obtained motion amount (δzIIs+δzIm) is outputted to the axis control circuit 33 (Step B9). Receiving this motion amount, the axis control circuit 33 performs position and speed feedback control as described above, to thereby drivingly controls the servo motor 53 through the servo amplifier 43. Thus, the slave axis ZIIs is driven to move according to the superposition of the motion amount δzIm for the master axis ZIm on the motion amount δzIIs for the ZIIs axis itself.

The above-described processing of Step B1 and Steps B5 to B9 is performed in each distribution period until a superposing control terminate command is inputted and the flag F1 is set at "0", or a slave axis motion suspend command is inputted and the flag F2 is set at "1".

When a slave-axis motion suspend command is inputted and the flag F2 is set to "1", the procedure proceed from Step B5 to Step B10, where a motion amount δzIm for the master axis ZIm of the superposing control in the present distribution period is read. Then, the motion amount δzIm for the master axis ZIm is subtracted from the present coordinate value (zIIs) of the slave axis ZIIs registered in the register R (Step B11). Like this, regarding the slave axis, after a slave axis motion suspend command is inputted and the flag F2 is set at "1", the processing of Steps B1, B5, B10 and B11 is performed in each distribution period. When a slave axis motion resume command is inputted and the flag F2 is set at "0", the above described processing of Steps B1 and B5 to B9 is performed in each distribution period. Further, when a superposing control terminate command is inputted and the flag F1 is set at "0", processing of Steps B1 and B2 to B4 is performed.

In the present invention, when motion of a slave axis is stopped during superposing control and the superposing control is suspended for a while, and then motion of the slave axis is resumed and the superposing control is resumed, the positional relation which the master axis and the slave axis had just before the slave axis was stopped can be easily restored. Thus, the slave axis can be stopped freely without canceling the superposing control.

What is claimed is:

1. A numerical controller for performing a superposing control to control motion of a slave axis parallel to a master axis for moving a workpiece, by a superposed motion command obtained by superposing a motion command for the master axis on a motion command for the slave axis, comprising:

means for receiving a slave-axis motion suspending command commanded by a program or an inputted signal in the superposing control; and means for suspending the motion of the slave axis and subtracting an amount of the motion command, commanding the master axis, from a coordinate value of the slave axis in a workpiece coordinate system set to the workpiece when the slave-axis motion suspending command is received, wherein the superposing control is continued while the motion of the slave axis is suspended.

2. A numerical controller according to claim 1, further comprising:

means for receiving a slave-axis motion resuming command commanded by the program or an inputted signal; and means for resuming the motion of the slave axis so that the superposing control is resumed when the slave-axis motion resuming command is received.

3. A method of performing a superposing control to control motion of a slave axis parallel to a master axis for moving a workpiece, by a superposed motion command obtained by superposing a motion command for the master axis on a motion command for the slave axis, comprising:

receiving a slave-axis motion suspending command commanded by a program or an inputted signal in the superposing control;

suspending the motion of the slave axis and subtracting an amount of the motion command commanding the master axis from a coordinate value of the slave axis in a workpiece coordinate system set to the workpiece when the slave-axis motion suspending command is received; and continuing the superposing control while the motion of the slave axis is suspended.

4. The method of claim 3, further comprising:

receiving a slave-axis motion resuming command commanded by the program or an inputted signal; and resuming the motion of the slave axis so that the superposing control is resumed when the slave-axis motion resuming command is received.

5. A numerical controller for performing a superposing control to control motion of a slave axis parallel to a master axis for moving a workpiece, by a superposed motion command obtained by superposing a motion command for the master axis on a motion command for the slave axis, comprising:

a first unit receiving a slave-axis motion suspending command commanded by a program or an inputted signal in the superposing control; and a second unit suspending the motion of the slave axis and subtracting an amount of the motion command, commanding the master axis, from a coordinate value of the slave axis in a workpiece coordinate system set to the workpiece when the slave-axis motion suspending command is received, wherein the superposing control is continued while the motion of the slave axis is suspended.

* * * * *

UNITED STATES PATENT AND TRADEMARK OFFICE
CERTIFICATE OF CORRECTION

| | | |
|---|---|---|
| PATENT NO. | : 7,095,203 B2 | Page 1 of 1 |
| APPLICATION NO. | : 10/821917 | |
| DATED | : August 22, 2006 | |
| INVENTOR(S) | : Takahiko Endo et al. | |

It is certified that error appears in the above-identified patent and that said Letters Patent is hereby corrected as shown below:

In the drawings:

Fig. 5, change "WORPIECE" to --WORKPIECE--.

Column 2, Line 34, after "example)." start a new paragraph at: "There are such cases that...".

Column 4, Line 32, change "suspended" to --suspended,--.

Column 4, Line 36, change "$\delta zlm$" to --+$\delta zlm$--.

Column 5, Line 5, after "to the" delete "the".

Signed and Sealed this

Tenth Day of April, 2007

JON W. DUDAS
*Director of the United States Patent and Trademark Office*